United States Patent
Miller

(10) Patent No.: US 10,417,853 B2
(45) Date of Patent: Sep. 17, 2019

(54) PARKING SYSTEM AND METHOD FOR OPERATING A PARKING SYSTEM

(71) Applicant: Scheidt & Bachmann GmbH, Mönchengladbach (DE)

(72) Inventor: Norbert Miller, Mönchengladbach (DE)

(73) Assignee: Scheidt & Bachmann GmbH, Mönchengladbach (DE)

( * ) Notice: Subject to any disclaimer, the term of this patent is extended or adjusted under 35 U.S.C. 154(b) by 0 days.

(21) Appl. No.: 15/984,511

(22) Filed: May 21, 2018

(65) Prior Publication Data
US 2018/0342123 A1 Nov. 29, 2018

(30) Foreign Application Priority Data
May 23, 2017 (EP) .................................. 17172461

(51) Int. Cl.
| | |
|---|---|
| *G07C 9/00* | (2006.01) |
| *G07B 15/04* | (2006.01) |
| *H04W 4/44* | (2018.01) |
| *H04W 4/20* | (2018.01) |
| *H04W 4/80* | (2018.01) |

(52) U.S. Cl.
CPC ......... *G07C 9/00896* (2013.01); *G07B 15/04* (2013.01); *H04W 4/44* (2018.02); *G06Q 2240/00* (2013.01); *G07C 2009/00317* (2013.01); *G07C 2209/63* (2013.01); *H04W 4/20* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 6,990,444 B2* | 1/2006 | Hind .................... | G10L 21/06 704/235 |
| 8,924,716 B2* | 12/2014 | Miyabayashi ...... | H04L 63/0823 380/255 |
| 10,019,860 B1* | 7/2018 | Kim ................... | G07C 9/00182 |
| 2017/0055157 A1 | 2/2017 | Bergdale et al. | |

FOREIGN PATENT DOCUMENTS

| | | |
|---|---|---|
| DE | 10 2014 018 190 A1 | 7/2015 |
| EP | 2 312 537 A1 | 4/2011 |
| WO | WO 2016/123662 A1 | 8/2016 |
| WO | WO 2017/063089 A1 | 4/2017 |

OTHER PUBLICATIONS

European Patent Office, European Search Report—Application No. EP 17172461.0-1953, dated Dec. 8, 2017, 14 pages (In German).

* cited by examiner

*Primary Examiner* — K. Wong
(74) *Attorney, Agent, or Firm* — Sunstein Kann Murphy & Timbers LLP

(57) ABSTRACT

A parking system includes at least one first, near-field broadcasting device emitting a first radio field and at least one second, near-field broadcasting device emitting a second radio field. The system operates at least one access device. The first near-field broadcasting device transmits a first access data record, which is a function of a second access data record transmitted by the second near-field broadcasting device. An evaluation device identifies an associated access device in the system based on an evaluation of the functional relationship between the first access data record and the second access data record.

14 Claims, 6 Drawing Sheets

PARKING SYSTEM AND METHOD FOR OPERATING A PARKING SYSTEM

RELATED APPLICATION

The present application claims priority from European patent application number 17172461.0, filed May 23, 2017, the full disclosure of which is hereby incorporated by reference herein.

TECHNICAL FIELD

The application relates to a parking system, in particular for a parking facility, comprising at least one access arrangement with at least one access device, configured for monitoring a passage from a first area with an entrance segment to a further area, at least one first broadcasting device associated with the access device and configured to emit a first radio field, wherein the first radio field carries at least a first access data record receivable by a mobile terminal located in the entrance segment. Furthermore, the application relates to a method for operating a parking system, an access application and a mobile terminal.

BACKGROUND ART

A parking system for parking facilities, such as car parks, multi-story car parks and similar installations, generally has one or more access arrangement(s). An access arrangement generally comprises one or more access device(s). By way of example, an access arrangement can be provided by a barrier with a swivel-mounted barrier arm. With such an access device, in particular the passage of a vehicle from a first area to a further area can be monitored or controlled. Thus, at a parking facility an access arrangement with at least one access device can be provided, in order to control the passage from an unmonitored area, by way of example a street, to a monitored area, by way of example the parking area. In other words, the entry into the parking facility can be controlled by an access device. Alternatively, or additionally, a parking facility can be provided with an access arrangement with at least one exit device, in order to control the passage of a vehicle from the monitored area to the unmonitored area. In other words, the exit from the parking facility can be controlled by an access device.

With known access devices, the entry into a parking facility is allowed following the generation of a short-term parking ticket as a result of a user action. At the end of a parking time, the short-term parking ticket, in particular a paper ticket, is then paid for by a user at an automated machine and upon exiting checked by a validation device of the exit device. If the outcome of the check is positive, passage is enabled. However, if the validation device finds that the ticket, by way of example, has not yet been paid for or that the payment was made too long ago, then the exit device remains closed.

A constant concern with parking systems is to improve user comfort. In particular, manual user actions are not considered user-friendly. To this end, in the prior art, parking systems are known in which the necessary user actions are able to be minimised.

An exemplary parking system 700 according to the prior art is shown in FIG. 7. The parking system 700 comprises an access arrangement 702 with two access devices 704.1, 704.2. Each access device 704.1, 704.2 is associated with a broadcasting device 710.1, 710.2, which in each case emits a radio field carrying an access data record. With the access arrangement 702 or the access devices 704.1, 704.2 generally the passage from a first area 706 to a further area 708 can be monitored.

When the parking system 700 is operational, greater user comfort is enabled in that the user no longer has to use a short-term parking ticket in the conventional manner for passage. Instead of the short-term parking ticket a mobile terminal 732 associated with the user can be employed, on which an access application can be installed. If the mobile terminal 732 receives a radio field 712.1, 712.2 with an access data record carried hereby, it processes the received access data record with the help of the access application and sends an access message to a control device 724 via a wireless communication network 736. The control device 724 can then, based on the received access data record, determine which broadcasting device is sending this access data record and derive from this data the access device associated with the broadcasting device. This access device can then be actuated in order to enable the passage. In other words, it should be ensured that the correct entrance to the multi-story parking facility is enabled, namely that in front of which the vehicle 718 is standing.

However, a problem here is that a radio field 712.2 from a second access device 704.2 can also be received by a mobile terminal 732, which is actually positioned in front of the first access device 704.1. In this case, the mobile terminal 732 receives both access data records or only the "wrong" additional data record. While in the last case the wrong access device is controlled and actuated, in the first case it is not possible to unequivocally determine the access device to be controlled and actuated, respectively.

It is known from the prior art to use broadcasting devices with directional antennas, in order to influence the radio field strength and thus improve the formation or dimensioning of radio fields. But in practice, here also, by way of example, due to unavoidable inaccuracies in the adjustment, and reflections and interferences, errors occur. It must also be guaranteed that a radio field can be received by a mobile terminal irrespective of where it is in a vehicle. A reliable operation of such a parking system is therefore problematical.

SUMMARY OF THE EMBODIMENTS

The parking system comprises at least one access arrangement with at least one access device, configured for monitoring a passage from a first area with an entrance segment to a further area. The parking system comprises at least one first local broadcasting device associated with the access device, configured to emit a first radio field. The first radio field carries at least one first access data record receivable by a mobile terminal located in the entrance segment. The parking system comprises at least one second local broadcasting device associated with the access device, configured to emit a second radio field. The second radio field transmits at least one second access data record receivable by the mobile terminal located in the entrance segment.

Because, unlike in the prior art, at least two broadcasting devices are (unambiguously) associated with an individual access device, this access device can be determined in a more reliable and in particular more unambiguous way by evaluating the first and second access data records of the emitting broadcasting devices. So, it may happen that a further radio field from a broadcasting device associated with an adjacent access device is also received by a mobile terminal. However, from the three received additional data records the actual access device to be controlled can be determined. A more reliable operation of the parking system with simultaneous high user comfort is achieved.

The parking system for a parking facility, such as a car park, multi-story car park or similar installations, has one or more access arrangement(s). An access arrangement comprises one or more access device(s). Preferably, as an access arrangement a barrier means with at least one barrier boom arranged so that it can swivel on a column can be provided. It shall be understood, however, that as barrier means in an access arrangement a roller door, swivel door, sectional door, retractable bollard, barrier arm and similar can be used. The access arrangement may also come without any actual barrier means and monitor the passage by means of a light signal.

In front of an access device (seen in the direction of passage), in the first area, an entrance segment is provided which a vehicle which is to drive through the access device, must pass first. With the access device, the passage of a vehicle from a first area to a further area can be monitored or controlled. By way of example, at a parking facility at least one access arrangement with respectively one access device is provided, to control the passage from an unmonitored area to a monitored area, by way of example the parking area of the parking facility. In other words, entering the parking facility can be controlled by the precisely one access device (entrance). Alternatively, or additionally, at the parking facility at least one access arrangement with at least one access device can be provided, to control the passage from the monitored area to the unmonitored area. In other words, exiting the parking facility can be controlled by precisely one access device (exit). It shall be understood that a parking facility may well have a number of entrances and exits.

Preferably, at least two local broadcasting devices are unambiguously associated with each access device of a parking arrangement. Associated means in particular that for each access device at least one first local broadcasting device and at least one second local broadcasting device are provided. Here both the first radio field of the first local broadcasting device and the second radio field of the second local broadcasting device substantially cover a particular part of the entrance segment of the first area, in particular (almost) the entire entrance segment. In other words, to pass the access device a vehicle must pass the first and the second radio field.

The first radio field carries, in particular transmits, at least one first access data record, and the second radio field carries at least one second access data record. The first access data record and the second access data record are formed in such a way that the emitting broadcasting devices can be identified, so that in this way the access device (unambiguously) associated with these can be (unambiguously) identified. Here, the first and the second access data records can differ from one another. An access data record can, by way of example, comprise an unambiguous code.

A first (or second) local broadcasting device is configured to preferably emit the first (or second) radio field (quasi) continuously. Such a broadcasting device is in particular a broadcasting device with a minimum range of at least 2 m, preferably at least 2.5 m, and a maximum range of at most 5 m, preferably at most 4 m. By way of example, RFID technology, infrared technology, WiFi technology and/or a sonic technology can be used. Preferably the first (or second) radio field can be a Bluetooth radio field emitted by a Bluetooth beacon. Particularly preferably, as a broadcasting device a BLE (Bluetooth Low Energy) beacon can be used.

A radio field emitted by such a broadcasting device is receivable by a mobile terminal located in range of the broadcasting device. Exemplary mobile terminals are smartphones, tablet computers, mobile games consoles, laptops, netbooks, data glasses, smart watches and similar wearables. In this case, a mobile terminal is also understood to be a device integrated into the vehicle (such as a navigation system, etc.).

Basically, the first access data record and the second access data record can each comprise a random item of information (code), allowing an unambiguous identification of the associated access device. For a particularly reliable and unambiguous evaluation, according to a first preferred embodiment of the parking system according to the application, it is proposed that the first access data record can be a function of the second access data record. The term "function" is not limited to the mathematical definition of a function. According to embodiments of the invention any method is meant which allows a second data record to be inferred from a first data record. In one embodiment this can take place by a mathematical function, in particular by a reversibly univocal function, and in another embodiment by way of example by a reference table. In an exemplary embodiment the following functional relationship between the first access data record $D_1$ and the second access data record $D_2$ can be present:

$$D_1 = f(D_2). \quad (a)$$

By way of example, in this case $D_2$ can be formed as follows:

$$D_2 = g(s,t),$$

wherein s can be a random value, t the time point of emission and g a correlation (e.g. a function) of the parameters s and t. On the basis of the evaluation of the functional relationship between the access data records of two local broadcasting devices, which are unambiguously associated with an individual access device, this access device can be determined easily.

According to a further preferred embodiment, the first local broadcasting device can be arranged on a first side edge of the entrance segment of the access device. The second local broadcasting device can be arranged on a second side edge, opposite the first side edge, of the entrance segment of the access device. Because the local broadcasting devices of an access device are arranged on opposite sides of the entrance segment, through the corresponding radio fields in a simple manner sufficient coverage of the entrance segment can be ensured. In particular, it can further be ensured that for two adjacently arranged access devices with correspondingly adjacently arranged entrance segments at least in each case one local broadcasting device is positioned a maximum distance away from the respectively not associated access device. In this way, it can be ensured in a reliable manner that a mobile terminal in the area of a first entrance segment is at least unable to receive both radio fields of the adjacent second access device. This can in particular be further supported by a directional radiation of the radio fields of the local broadcasting devices. Moreover, the selectivity at the terminal can be increased by intelligently arranged reflectors and/or absorbers and/or screening and damping elements in the area of an entrance segment.

Furthermore, the parking system according to a further embodiment can comprise at least one evaluation device. The evaluation device can be configured to determine the associated access device, at least on the basis of the received first access data record and the received second access data record. In particular, from the first and the second access data record the associated access device can be determined, by way of example by evaluating the above functional relationship between the access data records. The result of the evaluation can then be taken into consideration in the control and in particular enabling of a passage through an access arrangement.

The parking system can preferably comprise at least one control device, configured to enable a passage through a determined access device. The control device can comprise a control module, configured to control the determined access device depending on the evaluation result. The evaluation result can be provided to the control module. By way of example, the control device can comprise the evaluation device. Depending on the evaluation result, a control signal can be generated and by way of example transmitted to an actuator (e.g. a motor) and/or a signal of the determined access device to allow or deny a passage. In other words, in this way the passage can be enabled and released, respectively, (or blocked) by an access device. The control device can be at least partially integrated into a local computing device of the parking facility, in a remotely arranged central computing device and/or in the access device.

According to a further embodiment, the control device can comprise at least one receiver module, configured to receive an access message from the mobile terminal or a transmitter integrated into the vehicle. The access message can comprise at least one third access data record, corresponding to the first received access data record and the second received access data record. By way of example, the mobile terminal or transmitter integrated into the vehicle can comprise the evaluation device. In this case, the third access data record can be an evaluation data record. The evaluation data record can comprise at least one piece of information on the access device determined in the evaluation step. Alternatively, or additionally, the first and the second access data record can by way of example form two third access data records. These third access data records can then by way of example be provided to an evaluation device of the control device. It shall be understood that in this case one or more further access data record(s) can be transmitted as third access data records. These can originate from adjacently arranged local broadcasting devices. As described above, in the evaluation step the correct access device can nevertheless be determined unambiguously.

The access message can comprise further data records, such as a timestamp and in particular at least one identifier associated with the mobile terminal and/or the user of the mobile terminal. By way of example, it can be provided that a passage through the access device is only allowed to authorised users. This can be ensured by checking the identifier, by way of example by comparing the identifier with a positive list or a negative list.

According to a further preferred embodiment of the parking system according to the application, the receivable access message can (additionally) comprise at least one status data record of the mobile terminal. The status data record can represent at least one coupling state of the mobile terminal with a coupling device of the vehicle. By way of example, the access data record can comprise a status indicator (flag), to indicate whether a coupling is present (e.g. status indicator is set) or not (e.g. status indicator is not set). The coupling device can be a hands-free system of the vehicle and/or a device (e.g. a specially-designed park dongle) plugged into an interface (e.g. an OBD (On-Board-Diagnostics) interface). A coupling can be a Bluetooth link or another link (e.g. WiFi, infrared, etc.). If the mobile terminal has a corresponding coupling, in particular a corresponding indicator can be inserted in the access message.

In particular, when there are multiple mobile terminals in a vehicle the case may arise that according to the prior art no unambiguous association of a parking transaction with an individual user/mobile terminal is possible. As a rule, it is desirable to associate the parking transaction with the driver. Here it has been recognised that generally the mobile terminal of the driver is coupled with a coupling device of the vehicle. Thus, the coupling state is a preferred indicator for the selection of a mobile terminal from a plurality of terminals, that may be present in a vehicle.

Upon exiting a parking facility, alternatively or additionally, for identifying a desired mobile terminal from a plurality of mobile terminals, the data stored at the time of entry may be used. Thus, the identifiers of the users/mobile terminals can be compared with the identifiers of the users/mobile terminals stored upon entry. If a correspondence is detected, the identifier to be used can be identified.

It can also be provided that a communication with the users is started and one user out of a plurality of vehicle passengers confirms that the parking transaction should be associated with him, by way of example by sending a response to a corresponding message (in particular a push message).

Furthermore, it may arise that users with a mobile terminal, but no vehicle, pass the first radio field and the second radio field (by way of example, on foot). In order to prevent an unintentional enabling of an access device and/or by way of example an unintentional billing of a parking transaction, the parking system according to a further embodiment can comprise at least one vehicle detection device associated with the access device. The vehicle detection device, by way of example an induction loop, can be configured for detecting a vehicle in front of the access arrangement. The control device can comprise at least one evaluation module, configured to determine whether at the determined access device a vehicle is being detected. In particular, (immediately) after or during the evaluation step described above, a check can be made on whether a vehicle is actually present at the determined access device. If this is not the case, the process can be discontinued. Otherwise, by way of example, a corresponding control of the access device can take place. The evaluation module can, by way of example, be partially integrated into the evaluation device. It shall be understood that apart from an induction loop, other devices can also be used with which the presence of a vehicle in front of the access arrangement can be established. This includes, by way of example, cameras, image processing systems, ultrasound sensors, pressure sensors, vehicle weighbridges, photoelectric barriers, etc.

To prevent unintentional enabling of an access device and/or an unintentional billing of a parking transaction, the parking system according to a further embodiment can comprise at least one fourth local broadcasting device within the monitored area. The at least one fourth local broadcasting device can send a further code (comprising for example a transmitter identifier and a timestamp), which is receivable by terminals that have successfully passed the access device. Terminals which have stayed at the access device, but then are not located in the monitored area (e.g. unintentional "users", who were on foot in the vicinity of the access device) can in this way be securely excluded from unintentional billing. In particular, a time interval could also be set and monitored: terminals, which have received the code from the at least one fourth transmitter device, but for which the time interval between receipt of the access data records (of the first and second broadcasting devices) and receipt of the further code (from the fourth broadcasting device) is greater than that defined by the parking system, can be excluded from the billing. Thus, by way of example, a distinction can be made between (slow) pedestrians and users in a vehicle.

The mobile terminal can preferably comprise an access application (e.g. an app). This access application can, in particular, be configured to process received access data records and/or to detect a coupling state. By way of example, the access arrangement can comprise a processing means for generating an access message as described above. The processing means can cause the emission of this access message by the mobile terminal. The communication address of a particular receiver can be stored in the mobile terminal (e.g. communication address of the central computing device) and/or by way of example be transmitted via the first and second radio fields.

To avoid a manual activation and to allow a rapid, user-friendly passage through an access device, the parking system according to a further embodiment can comprise at least one third broadcasting device associated with the access arrangement. The third broadcasting device can be configured to emit a third radio field, carrying an activation data record for activating an access application installed on the mobile terminal. By starting the access application before reaching the access section, the application can immediately process the received access data records when reaching the access section. Waiting time can at least be reduced. The at least one third broadcasting device, by way of example a local broadcasting device, can be positioned in such a way that a vehicle, that is driven into the parking facility (or driven out of the parking facility), must pass the third radio field. The at least one third broadcasting device can also be positioned in such a way that the journey time to the entrance segment is at least greater than the time (probably) required for starting the access application.

Alternatively, or additionally, it can be provided that the mobile terminal comprises a position sensor (e.g. GPS sensor, etc.). Upon reaching at least one predefinable geographical area an automatic activation (waking up) of the access application can take place.

Preferably, the first local broadcasting device and/or the second local broadcasting device can comprise a directional antenna. In this way an entrance segment can be covered with greater accuracy by a radio field.

As already described, the association of at least two local broadcasting devices with an individual access device is expedient, in particular in an access arrangement with a plurality (>1) of access devices. According to a particularly preferred embodiment the access arrangement can comprise at least two access devices arranged adjacent to one another. Each of the access devices arranged adjacent to one another can be associated with at least one (previously described) first local broadcasting device and one (previously described) second local broadcasting device. A (previously described) evaluation device can be configured (as described above) to determine the associated access device from the at least two access devices, at least on the basis of the first received access data record and the second received access data record.

Furthermore, between adjacent entrance segments, in particular between the adjacent side edges, a shield that is impenetrable or hard to penetrate by the radio fields or has a (strong) damping effect can be arranged (e.g. in the form of a correspondingly formed dividing wall from electrically conductive material or similar).

An association of a first and a second local broadcasting device to an access device can also be controlled by a local computing device or by a central computing device arranged remotely. By way of example, each of these local broadcasting devices can have a communications link to a computing device. A computing device can be configured, to provide (e.g. to generate) the first access data record and the second access data record in such a way that an unambiguous association with the access device exists. These access data records can then be transmitted to the corresponding local broadcasting devices via the communications link. Any adaptation or change to the access data records that may be necessary can be controlled in a simple manner. In addition, in this case the evaluation device can preferably be integrated into the corresponding computing device, which provided the access data records. An evaluation based on the access data records provided can then be carried out.

A further aspect of the application is a method for operating a parking system, in particular a parking system described above, wherein the parking system comprises at least one access arrangement with at least one access device. The method comprises:
- emitting, by a first local broadcasting device associated with the access device, a first radio field with at least one first access data record;
- emitting, by a second local broadcasting device associated with the access device, a second radio field with at least one second access data record;
- wherein the first radio field and the second radio field are receivable by a mobile terminal;
- determining the associated access device at least on the basis of the first received access data record and the second received access data record in an evaluation step; and
- enabling a passage through the determined access device at least on the basis of the evaluation result of the evaluation step.

A further aspect of the application is an access application for a mobile terminal. The access application comprises at least one receiving means for obtaining one first received access data record and at least one second received access data record. The access application further comprises at least one processing means for processing the received first access data record and the obtained second access data record, such that an emission of an access message, comprising at least one third access data record corresponding to the first access data record and the second access data record, is caused.

The access application, in particular a computer program can, in particular, be installable on the mobile terminal.

According to a preferred embodiment of the access application according to the application the access application can comprise at least one (previously described) evaluation device, configured to determine the associated access device, at least on the basis of the received first access data record and the received second access data record, in an evaluation step. The processing means can be configured to generate a third access data record on the basis of the evaluation result.

A further aspect of the application is a mobile terminal, comprising at least one previously described access application.

The features of the parking systems, devices, method, facilities and access applications and/or computer programs are freely combinable with one another. In particular, features of the description and/or the dependent claims can be inventive in their own right, including with complete or partial bypassing of features of the independent claims, in isolation or freely combined with one another.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
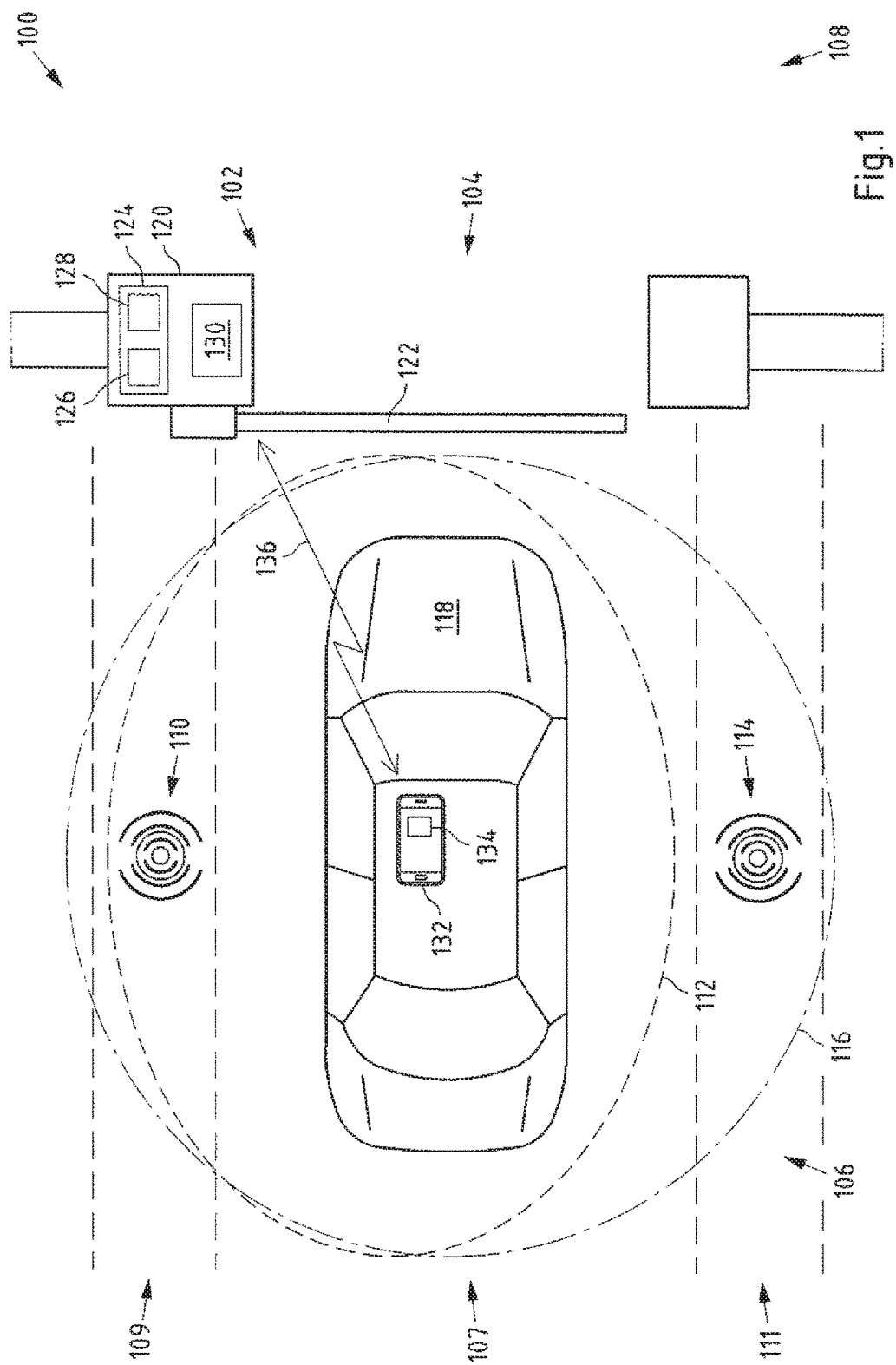
FIG. 1 shows a schematic view of an exemplary embodiment of a parking system according to the present application.

In the following, similar reference numerals will be used for similar components.

FIG. 1 shows a schematic top view of an exemplary embodiment of a parking system 100 according to the present application. The parking system shown comprises an access arrangement 102 with an access device 104. It shall be understood that according to other variants of the application multiple access arrangements and/or multiple access devices can be provided. The parking system 100 can in particular be applied at parking facilities, such as car parks or multi-story car park installations.

The access device 104 is in this case formed as a barrier 104 with a barrier arm 122 secured to a column 120. It shall be understood that other forms of access devices can be used. The access device 104 is configured, to control the passage from a first area 106, in particular an entrance segment 107 (arranged in the direction of travel of a vehicle in front of the access device) of the first area 106, to a further area 108. If the access device 104 is a multi-story car park entrance, the first area 106 in particular represents the unmonitored area and the further area 108 the monitored area, in particular the parking area. If the access device 104 is a multi-story car park exit, the reverse is true.

To enable the passage through the access device 102 a controllable actuator 130 (e.g. an electric motor) is provided. The actuator 130 is in particular configured to operate the barrier arm 122 according to a control (drive) signal.

The parking system 100 in this case comprises a first local broadcasting device 110 and a second local broadcasting device 114. The first local broadcasting device 110 is unambiguously associated with the access device 104. The second local broadcasting device 114 is similarly unambiguously associated with the access device 104. The first local broadcasting device 110 emits a first radio field 112, and the second local broadcasting device 114 emits a second radio field 116. Preferably, each near-field broadcasting device 110, 114 can take the form of a Bluetooth beacon, in particular a BLE beacon. The first radio field 112 carries at least one first access data record and the second radio field 116 at least one second access data record. It shall be understood that the further data records can be transmitted by the radio fields 112, 116.

The (unambiguous) association of the first broadcasting device 110 and the second broadcasting device 114 with the access device 104 is in particular represented by the first access data record and the second access data record. By way of example, the first access data record can comprise an unambiguous identifier, by which the association with the access device 104 is indicated. The same applies to the second access data record. Alternatively or additionally, between the two access data records a functional relationship can exist. From the result of a functional check of the two access data records, the associated access device 104 can then be unambiguously derived, and thus determined.

The local broadcasting devices 110, 114 can in particular be positioned in such a way that the entrance segment 107 is at least partially covered by the respective radio fields 112, 116. The entrance segment 107 can be arranged in a direction of entry in front of an access device and have definable dimensions. In particular, entrance segment 107 can be dimensioned in such a way that a vehicle 118 can pass it. Here the broadcasting devices 110, 114 can be adjusted in such a way that the vehicle 118 passing the entrance segment 107 at least in one segment is completely covered by the corresponding radio fields 112, 116. In this way it can be ensured that a mobile terminal 132 with an access application 134 (e.g. an app) present in the vehicle 118, can receive the first radio field 112 and the second radio field 116 upon passing the entrance segment 107.

As can be seen from FIG. 1, in the present preferred exemplary embodiment the first broadcasting device 110 is arranged on a first side edge 109 of the entrance segment 107 of the access device 104 and the second broadcasting device 114 on a second side edge 111 of the entrance segment 107 of the access device 104 opposite the first side edge 109.

In the present case, a control device 124, integrated in the column 120 of the access device 104, with at least one receiver module 126 and at least one control module 128 is also arranged.

In operation, the functioning of the parking system 100 shown is as follows:

The first local broadcasting device 110 and the second local broadcasting device 114 in each case emit almost continuously the first or second radio field 112, 116. Due to the positioning selected for the local broadcasting devices 110, 114 a vehicle 118 approaching the access device 104 via the entrance segment 107 must pass both radio fields 112, 116, in such a way that these radio fields 112, 116 are received by the mobile terminal 132 arranged in the vehicle 118.

The access application 134 installed on the mobile terminal 132 has in particular a processing means, in order to generate an access message and to cause an emission of the access message via a wireless communication channel 136 (e.g. a local radio field or a far field, such as a mobile telephone network). The access message can at least comprise a third access data record (e.g. an evaluation data record comprising an item of information on the determined access device and/or the actual first and second access data record) corresponding to the first received access data record and the second received access data record. Additionally, the access message can comprise an identifier in particular unambiguously associated with the mobile terminal 132 and/or user of the mobile terminal 132. A more detailed description by way of example follows.

The access message can be received by the receiver module 126 and by way of example evaluated by the control device 124. The control module 128 is in particular configured to control the determined access device 104 depending on the evaluation result. A suitable control signal is preferably transmitted to the actuator 130. Additionally, the control can preferably depend on an evaluation of the above-mentioned identifier. The control can in particular cause an opening (or closing) of the access device 104. The parking system 100 can be operated in a reliable and at the same time user-friendly manner.

Figure 2:
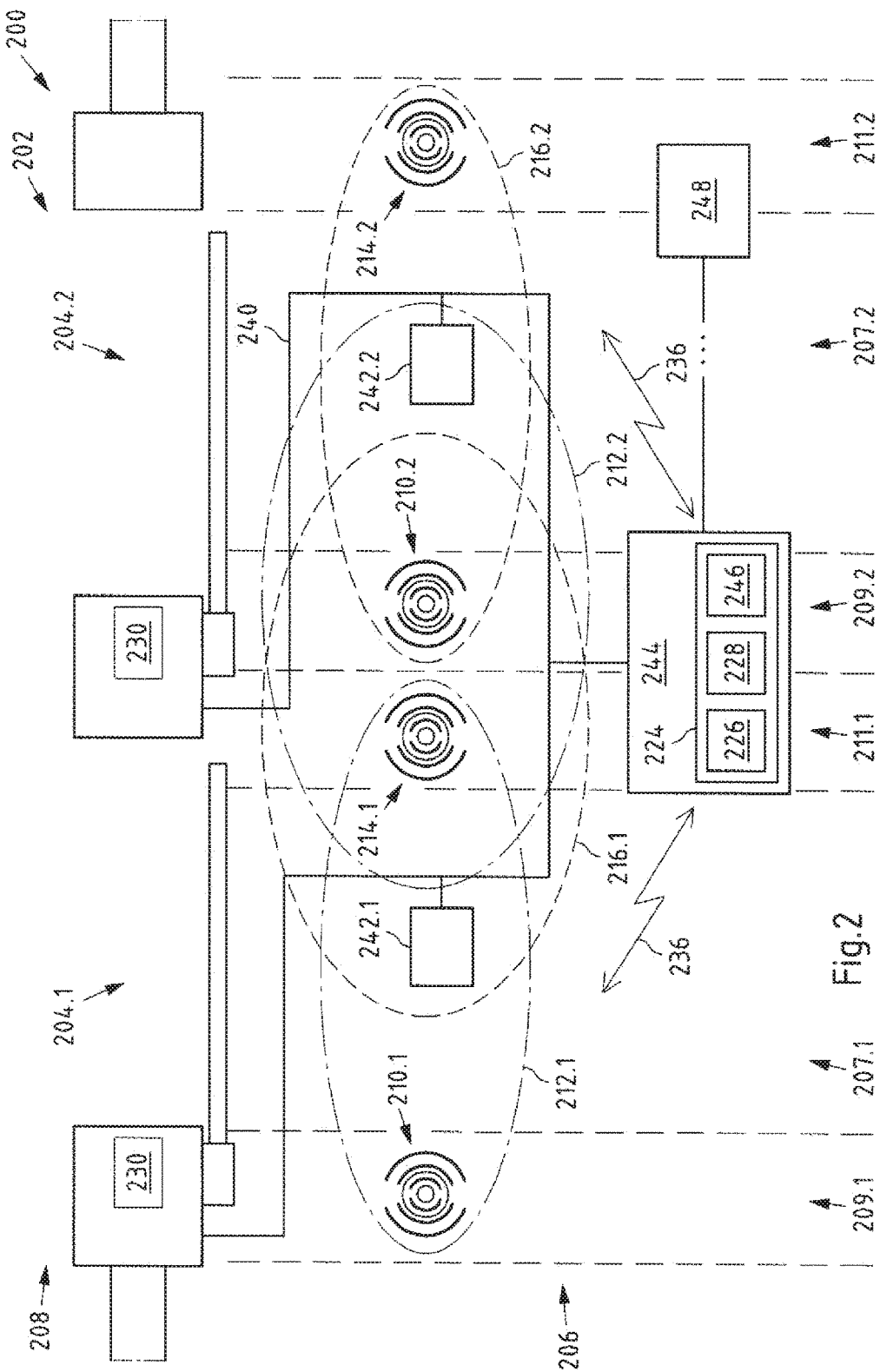
FIG. 2 shows a schematic view of a further exemplary embodiment of a parking system according to the present application.

FIG. 2 shows a further exemplary embodiment of a parking system 200 according to the present application. To avoid repetition in the following essentially only the differences from the exemplary embodiment according to FIG. 1 are described. For the other components of the parking system 200, reference is made to the above statements. In addition, for the sake of clarity a representation of vehicles and mobile terminals has been dispensed with.

The parking system 200 shown comprises an access arrangement 202 with at least two access devices 204.1, 204.2 arranged adjacently to one another. It shall be understood that two or more access arrangements can be provided.

Each access device 204.1, 204.2 is (unambiguously) associated in the manner described above with a first broadcasting device 210.1, 210.2 and a second broadcasting device 214.1, 214.2.

Furthermore, in the present exemplary embodiment each access device 204.1, 204.2 is also associated with a vehicle detection device 242.1, 242.2. In particular, in the present case induction loops 242.1, 242.2 are provided.

In the present case, the parking system 200 also comprises a local computing device 244 (e.g. a cell computer). The local computing device 244 can in particular be arranged in the parking facility, but separately from the access device 204. The local computing device 244 shown comprises a control device 224 with a receiver module 226, a control module 228 and an evaluation device 246. The evaluation device 246 shown is configured to determine the associated access device, at least based on the received first access data record and the received second access data record, as will be explained below in more detail. In the present exemplary embodiment, the evaluation device 246 can (also) form the evaluation module 246, which is configured to determine the presence of a vehicle in the area of vehicle detection device 242.1, 242.2. In particular, it can be determined if with the determined access device (in particular at the same point in time) a vehicle is being detected by the corresponding vehicle detection device 242.1, 242.2.

The local computing device 244 can in particular be connected with a remotely arranged central computing device 248 (e.g. one or more servers of what is known as a back office). The central computing device 248 can, by way of example, bill for parking transactions and/or check the authorisation of users before or after entry (and/or exit). In particular, in a database of the central computing device 248, user accounts with user data (identifiers, billing data (such as credit card data or other account details)) can be stored and used for the authentication check and/or billing. By way of example, a received identifier of a user/mobile terminal can be verified using the stored user data. Here the central computing device 248 can be configured to manage a plurality of parking facilities (e.g. in each case with local computing devices).

The local computing device 244 shown is also connected via a network 240 with the vehicle detection devices 242.1, 242.2 and the actuators 230 of the access devices 204.1, 204.2. Via the network 240, the control module 228 can control in the manner described above an access device 204 determined in an evaluation step to enable the passage.

It shall be understood that with other variants of the application the function of a local computing device can also be at least partially integrated into the central and remotely arranged computing device 248.

Preferably, each broadcasting device 210, 214 can have a directional antenna. Furthermore, optionally an (electromagnetic) shielding can be arranged between the side edges 211.1, 209.2 bordering one another of two access devices 204.1, 204.2 arranged adjacent to one another.

Figure 3:
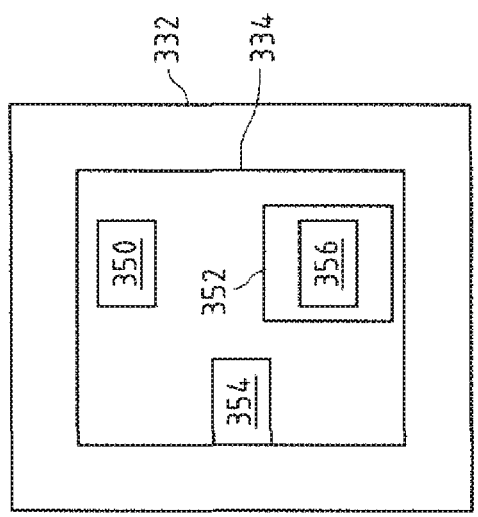
FIG. 3 shows a schematic view of an exemplary embodiment of a mobile terminal according to the present application with an exemplary embodiment of an access application according to the present application.

FIG. 3 is a schematic view of an exemplary embodiment of a mobile terminal 332 according to the present application. The mobile terminal 332 is characterised in particular by an access application 334 according to the application, in particular a computer program installed on the mobile terminal 332.

The access application 334 comprises a receiving means 350, configured to obtain received (described above) access data records. These are processed by a processing means 352. Optionally, the access application 334, in particular the processing means 352, can comprise an evaluation device 354 as described above.

The processing means 352 are in particular configured to generate an access message based on the access data records, in particular based on an evaluation result. In particular, an access message with a third access data record can be generated, e.g. an evaluation data record comprising an item of information on the determined access device and/or the actual first and second access data record. Here it may happen that upon receipt of a further radio field (e.g. from a further local broadcasting device of an adjacent access device) the access message can comprise a further first (or second) access data record. This is, by way of example, indicated in FIG. 2 (see in particular radio fields 212.2, 216.1, which in each case extend as far as the adjacent entrance segments 207.1 and 207.2).

Furthermore, the access message can comprise an (unambiguous) identifier of the mobile terminal 332 and/or of the user of the mobile terminal 332. Exemplary and not exhaustive identifiers are user names, the telephone number of the mobile terminal 332, an IMEI (International Mobile Station Equipment Identity) number of the mobile terminal 332, a MAC (Media-Access-Control) address of the mobile terminal 332, a credit card number, and/or a SIM (Subscriber Identity Module).

The access application 334 further comprises a detection means 354, configured to detect the (present) coupling state of the mobile terminal 332 with a coupling device of the vehicle. The coupling device can, by way of example, be a hands-free device of the vehicle or a similar device. The coupling device can also involve a parking element (e.g. OBD2 dongle). With such coupling devices a one-off connection (pairing) may be necessary. Then the coupling takes place between the devices automatically (with activated interfaces, e.g. Bluetooth). A corresponding coupling can be recognised by the detection means 354. On the basis of the detected coupling state, the processing means 352 can generate a status message with a corresponding status data record.

Following generation of the status message, the processing means 352 can cause an emission of the status message by the mobile terminal 332.

Figure 4:
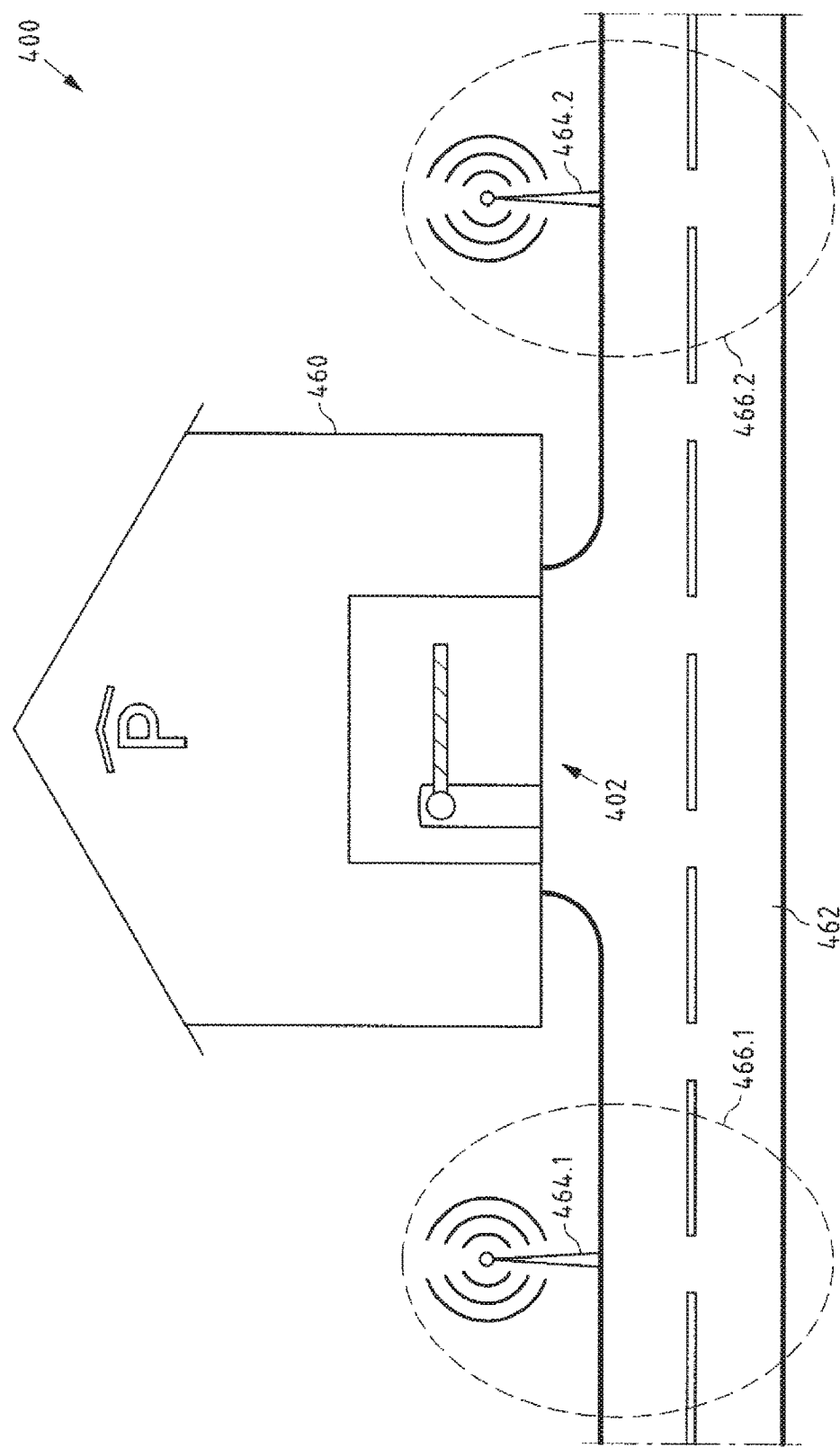
FIG. 4 shows a schematic view of a further exemplary embodiment of a parking system according to the present application.

FIG. 4 is a schematic view of a further exemplary embodiment of a parking system 400. To avoid repetition in the following essentially only the differences from the exemplary embodiments according to FIGS. 1 and 2 are described. For the other components of the parking system 400, reference is made to the above statements. In addition, for the sake of clarity a representation of vehicles, mobile terminals, access devices, first and second near-field local broadcasting device(s), etc. has been dispensed with.

The parking system 400 comprises a parking facility 460 in the form of a multi-story facility 460. What is shown is the structure of an access arrangement 402 (e.g. in the form of the access arrangement 202) at an entrance to the parking facility 460. The entrance can be reached via a street 462.

As can also be seen, the parking system 400 shown comprises a plurality of third broadcasting devices 464.1, 464.3, arranged at a specifiable distance from the access arrangement 402. Preferably each of the third broadcasting devices 464.1, 464.3 is (unambiguously) associated with the access arrangement 402.

A third broadcasting device 464.1, 464.3, in particular a local broadcasting device 464.1, 464.3, is configured to emit a third radio field 466.1, 466.2. The third broadcasting devices 464.1, 464.3 can in particular be positioned in such a way that a vehicle which is being parked in the parking facility 460, (in each case) must pass a third radio field 466.1, 466.2 first.

The third radio field 466.1, 466.2 carries at least an activation data record for activating an access application (e.g. access application 334) installed on a mobile terminal. The activation data record can in particular comprise a UUID (e.g. according to the iBeacon standard) and what are known as Major and Minor values (e.g. according to the iBeacon standard). The UUID values can be selected in such a way that a mobile terminal identifies the third radio field 466.1, 466.2 as originating from an iBeacon. The Major and Minor values can be used to represent an item of received information in the form of a service UUID of the first local broadcasting device and second local broadcasting device. Following receipt of the activation data record, in particular the access application on the mobile terminal can be started and in particular configured. Following receipt of the activation data record, the access application in particular knows which service UUIDs it must scan for, in order to receive and process first and second radio fields. Based on an assignment of the access arrangement 402 the third radio field 466.1, 466.2 can be correspondingly coordinated with the first radio fields and second radio fields.

It shall be understood that within the parking facility 460 suitable third broadcasting devices can be provided in front of the exits from the parking facility 460.

Figure 5:
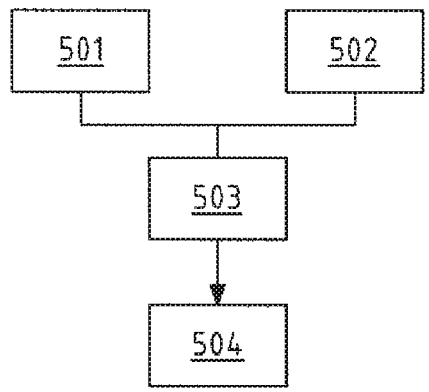
FIG. 5 shows a diagram of an exemplary embodiment of a method according to the present application.

The operation and functioning of the exemplary parking systems described above are described in more detail in the following with the help of FIG. 5.

In a first step 501, at least one first radio field is emitted by a first local broadcasting device (at least almost continuously). In step 502 at least one second radio field is emitted by a second local broadcasting device (at least almost continuously). The steps 501 and 502 can preferably be carried out in parallel. Both local broadcasting devices are associated with the same access device.

In an evaluation step 503, the associated access device can be determined, at least on the basis of the first access data record received (by a mobile terminal) and the second access data record received (by the mobile terminal). In particular it can be determined in this way which access device the vehicle comprising the mobile terminal is in front of. The evaluation step is described in more detail below.

In step 504 a passage through the determined access device can be enabled by controlling the corresponding access device, at least based on the evaluation result of the evaluation step.

Figure 6:
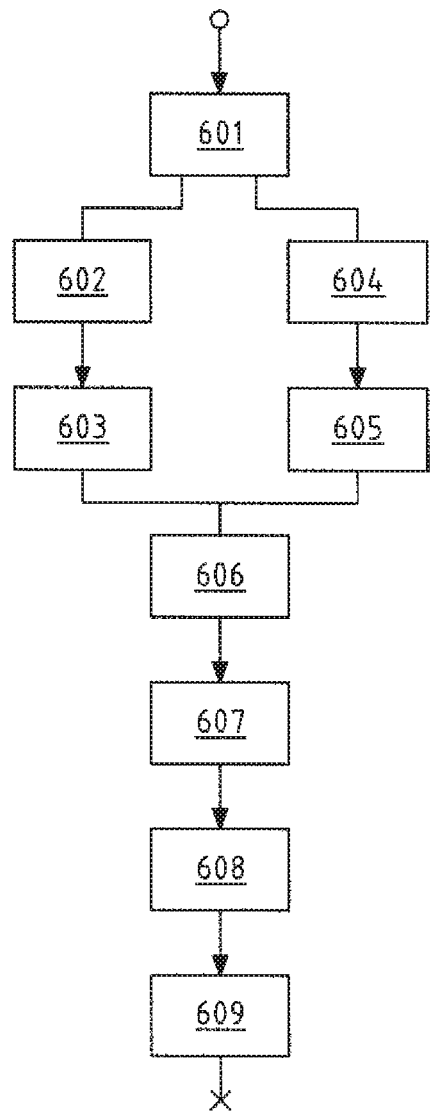
FIG. 6 shows a diagram of a further exemplary embodiment of a method according to an embodiment of the present invention.
Figure 7:
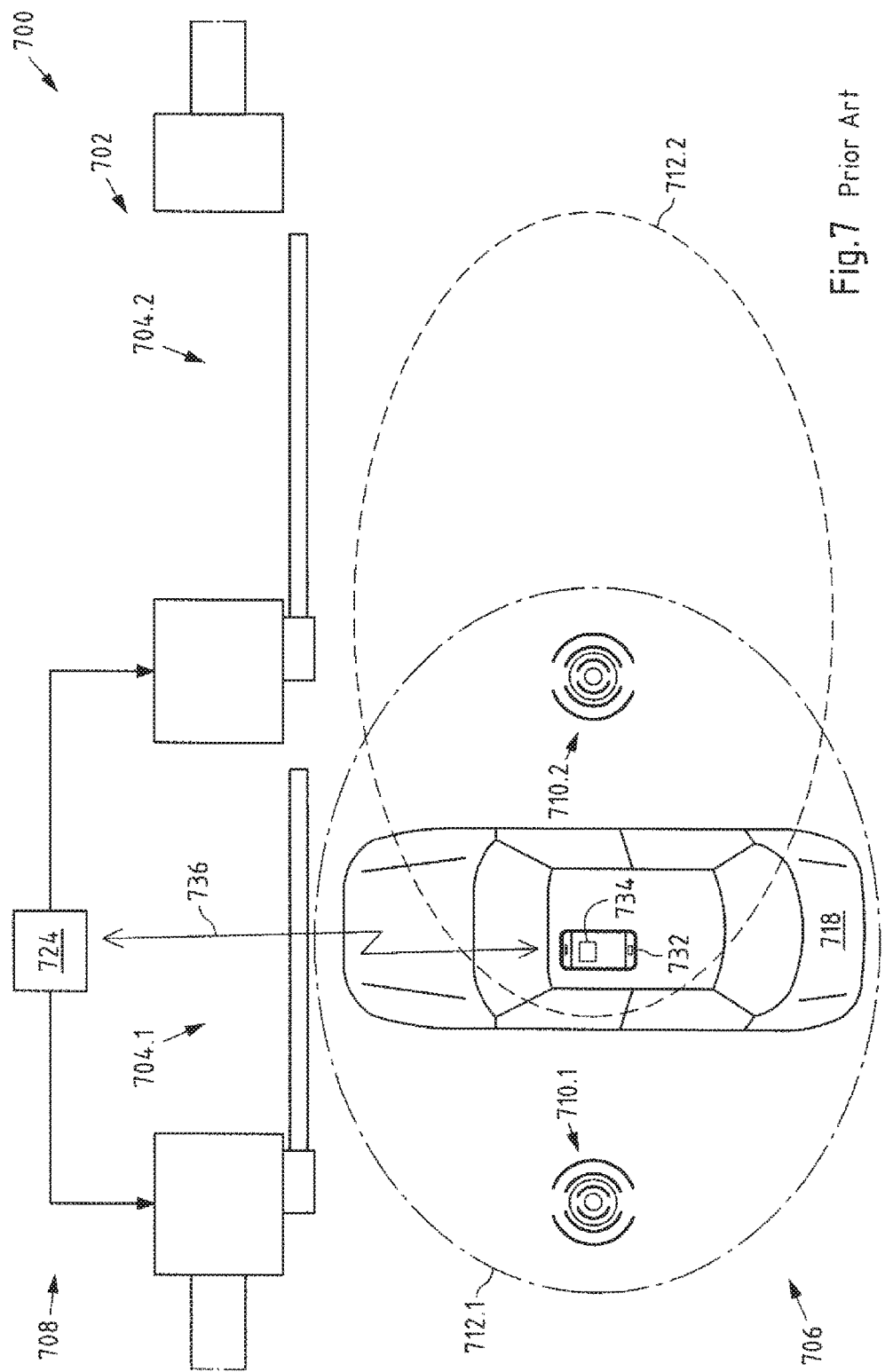
FIG. 7 shows a schematic view of an exemplary embodiment of a parking system according to the prior art.

FIG. 6 shows a further diagram of an exemplary embodiment of a method according to the present application. In particular, the method shown describes the identification of the access device in more detail.

If a vehicle with a mobile terminal approaches an access arrangement according to the application, in step 601 the mobile terminal receives at least two (different) access data records. The mobile terminal can preferably take the form of the exemplary embodiment in FIG. 3. In this case, all received first and second access data records can be obtained by the receiving means of the access application. Preferably, the access application can first be activated or woken up by a third radio field (see FIG. 4).

Depending on the configuration of the parking system, in particular the access application and/or the control device, the method can be continued in one embodiment according to steps 602 and 603 or with steps 604 and 605.

In step 602 the processing module can in particular cause the generation of an access message and its emission by the mobile terminal. In this case the access message can comprise as the third access data record all previously received first and second access data records. In other words, the received first and second access data records can be transmitted by the mobile terminal in an access message by way of example to a control device. Preferably, the access message can also comprise at least one (unambiguous) identifier of the mobile terminal and/or of the user of the mobile terminal and in particular a status data record of a coupling state of the mobile terminal.

It shall be understood that an access message, depending on the amount of data to be transmitted, can also comprise a plurality of access sub-messages. It shall be understood also that an access message can comprise further data such as, for example, a timestamp, a checksum and similar.

Following the transmission via a wireless communication channel, in particular a control device can receive the access message and evaluate this by means of an evaluation device (step 603). In particular, in this evaluation step it can be determined in front of which access device the vehicle comprising the mobile terminal is positioned. For this purpose, the evaluation device can evaluate the first and second access data records. In particular it can be checked from which first and second local broadcasting devices the received access data records were emitted and in particular with which access device these local broadcasting devices are associated Preferably a first access data record has a functional relationship with a second access data record (see, for example Formula a), if the corresponding local broadcasting devices are associated with the same access device. Via the function the local broadcasting devices can be linked together and with the rules for access unambiguously. In this case, in particular the following evaluation can take place:

$$\text{Result}=f(D_1,D_2) \tag{b}$$

The evaluation result can then in particular indicate unambiguously the correct access device.

Here, it may happen that apart from the (correct) access data records D1, D2, the mobile terminal has received a further (incorrect) first (or second) access data record from an adjacent access device. However, since the first and second local broadcasting devices of adjacent access devices are in particular arranged in such a way that a maximum of one radio field can extend into an entrance segment of the other access device, there is in particular no further second (or first) access data record from the adjacent access device. Due to this absence or because of the fact that no functional relationship between a received access data record and a further access data record can be determined, the correct access device can be reliably determined.

Alternatively, in steps 604 and 605 the process can be as follows: First, the evaluation step (see step 603) can be carried out in step 604 by an evaluation device of the terminal. In other words, the evaluation can be carried out by the mobile terminal receiving the access data records. Then in step 605, a third access data record can be generated by the processing means of the terminal. In this case, the third access data record can comprise the evaluation result (see Formula b). As described above, the access message can comprise further data records. The processing means can cause the emission of the access message by the mobile terminal.

It may happen that there is more than one mobile terminal in a vehicle. This can lead to two or more access messages being generated in step 602 or 605, emitted and received by a control device.

Following receipt of access messages, in the optional step 606 the control device can check at least one status data record of the access messages. By way of example, two access messages with identifiers of different mobile terminals can be received. The result of the evaluations (see step 603 or 604) may be the same access device. In particular for a subsequent billing of the parking transaction, from the at least two possible mobile terminals in step 606 a mobile terminal can be determined depending on the respective coupling states. If, by way of example, from one of the two access messages it results that a mobile terminal is currently coupled to a coupling device of the vehicle, this terminal is determined and the associated access message further processed with the identifier of this terminal (as described below). The other access message can, by way of example, be ignored and/or deleted.

It shall be understood that steps 603 and 606 can be performed at least partly in parallel and/or by the same evaluation device.

It may also happen that a mobile terminal is within the transmission range of a first and a second radio field, without the mobile terminal being located in a vehicle. By way of example, a user with a corresponding mobile terminal may walk through the corresponding radio fields. In order in this case, by way of example, to avoid an unintentional enabling of an access device, in step 607 the actual presence of a vehicle in the entrance segment in front of the determined access device can be determined. To this end, in step 607 a detection signal from the vehicle detection device can be evaluated. If this evaluation shows that no vehicle is present in the determined access device, the method can be interrupted. If a vehicle is detected at the determined access device, the method can be continued with optional step 608.

It shall be understood that in a simple case the evaluation can merely relate to the presence or absence of a detection signal.

Before enabling a passage through the access device it can in particular be provided that a received identifier of the mobile terminal and/or of the user of the terminal is checked (locally) (step 608). By way of example, in a local computing device a negative list with unauthorised identifiers can be stored. In a comparison step the received identifier can be compared with the stored identifiers. If the identifier matches a stored identifier, then the method can be interrupted. The access device remains blocked (or becomes blocked). If the identifier does not match any stored identifier, the method can be continued from step 609.

It shall be understood that this step can also be carried out previously, by way of example before step 606. It shall be also understood that this step can also be carried out with a positive list: if the identifier matches an identifier stored in a positive list the method is continued, otherwise it is interrupted.

Alternatively, or additionally, a check can also be made by the remotely arranged central computing device. The computing device can at least compare the identifier of the mobile terminal and/or the user of the mobile terminal with stored user data. In particular, a comparison can be made with the valid identifiers for the parking system, which can be stored in the central computing device, by way of example on the basis of previous registration steps. By way of example, before or during installation of the access application or at the time of initial use of the access application, a registration of the user/mobile terminal with the central computing device may be necessary. During registration, an unambiguous identifier can be set and stored both in a memory device of the mobile terminal (if not yet present) and in a memory device of the central computing device. Additionally, billing data can be stored in the registration step.

Additionally, in particular following the exiting from a parking facility, a further optional billing step can follow. This billing step can also take place prior to exiting. Here, by way of example, prior to exiting, in particular prior to an enabling, a check can be made whether payment has actually been made.

It shall be understood that the communications processes described above may be encrypted. In addition, it shall be understood the steps can be performed in a different order. By way of example, step 608 can take place first and then step 607. The steps can also be carried out at least partially in parallel.

To carry out the various steps, the devices/equipment may have suitable means (processors, memories, interfaces, etc.).

What is claimed is:

1. A parking system for a parking facility, comprising:
   at least one access arrangement with at least one access device configured to monitor a passage from a first area with an entrance segment to a further area, wherein the at least one access device includes a barrier to controllably allow or block the passage of a vehicle through one of the at least one access arrangement or a light signal configured to monitor the passage;
   at least one first, near-field broadcasting device associated with one of the at least one access device, configured to emit a first radio field, wherein the first radio field carries at least one first access data record receivable by a mobile terminal located in the entrance segment;
   at least one second, near-field broadcasting device associated with the one of the at least one access device, configured to emit a second radio field, wherein the second radio field carries at least one second access data record receivable by the mobile terminal located in the entrance segment,
   wherein the first access data record is a function of the second access data record; and at least one evaluation device configured to identify the associated one of the at least one access device, at least on the basis of an evaluation of the functional relationship between the first access data record and the second access data record.

2. The parking system according to claim 1, wherein the first near-field broadcasting device is arranged on a first side edge of the entrance segment of the access device, and the second near-field broadcasting device is arranged on a second side edge of the entrance segment of the access device opposite the first side edge.

3. The parking system according to claim 1, further comprising at least one control device configured to enable a passage through an identified access device, wherein the control device includes a control module configured to control the identified access device depending on the evaluation result.

4. The parking system according to claim 1, further comprising at least one control device configured to enable a passage through an identified access device, wherein the control device includes at least one receiver module configured to receive an access message from the mobile terminal, and wherein the access message includes at least one third access data record corresponding to the first received access data record and the second received access data record.

5. The parking system according to claim 4, wherein the received access message includes at least one status data record of the mobile terminal, wherein the status data record includes at least one coupling state of the mobile terminal with a coupling device of the vehicle.

6. The parking system according to claim 1, further comprising at least one vehicle detection device associated with the access device, wherein the vehicle detection device is configured for detecting a vehicle in front of the access device, and wherein the control device includes at least one evaluation module, configured to identify whether at the identified access device a vehicle is detected.

7. The parking system according to claim 1, further comprising at least one third broadcasting device associated with the access arrangement, wherein the third broadcasting device is configured to emit a third radio field carrying an activation data record for activating an access application installed on the mobile terminal.

8. The parking system according to claim 1, wherein the first near-field broadcasting device includes a directional antenna.

9. The parking system according to claim 1, wherein the second near-field broadcasting device includes a directional antenna.

10. The parking system according to claim 1, wherein the at least one access arrangement comprises at least two adjacently arranged access devices, wherein each of the adjacently arranged access devices is associated with at least one first near-field broadcasting device and one second near-field broadcasting device, and wherein an evaluation device is configured to identify the associated access device from the at least two access devices, at least based on the respective functional relationship between the respective first access data record and the respective second access data record.

11. A method for operating a parking system for a parking facility having at least one access arrangement with at least one access device, wherein the at least one access device includes a barrier to controllably allow or block passage of a vehicle through one of the at least one access arrangement or a light signal configured to monitor the passage, the method comprising:
emitting, by a first near-field broadcasting device associated with one of the at least one access device, a first radio field with at least one first access data record;
emitting, by a second near-field broadcasting device associated with the one of the at least one access device, a second radio field with at least one second access data record, wherein the first radio field and the second radio field are receivable by a mobile terminal and the first access data record is a function of the second access data record;
identifying the associated one of the at least one access device at least on the basis of an evaluation of the functional relationship between the first received access data record and the second received access data record in an evaluation step; and
enabling a passage through the identified one of the at least one access device at least on the basis of the evaluation result of the evaluation step.

12. An access application encoded on a tangible computer readable medium, the access application comprising:
receiving program code configured to obtain a first received access data record and at least one second received access data record, wherein the first access data record is received via a first radio field emitted by a first near-field broadcasting device associated with an access device and the second access data record is received via a second radio field emitted by a second, near-field broadcasting device associated with the access device,
processing program code configured to process the received first access data record and the received second access data record, in such a way that an emission of an access message including at least one third access data record corresponding to the first access data record and the second access data record is brought about, wherein the first access data record is a function of the second access data record; and
evaluation program code, configured to identify the associated access device, at least based on an evaluation of the functional relationship between the first access data record and the second access data record.

13. A mobile terminal comprising:
at least one access application encoded on a tangible computer readable medium according to claim 12;
a processor for running the at least one access application; and
a wireless transmitter.

14. The mobile terminal of claim 13, wherein the processing program code is configured to generate a third access data record on the basis of the evaluation result and the third access data record being transmittable by the wireless transmitter over a wireless communication channel.

* * * * *